Figure 1A:
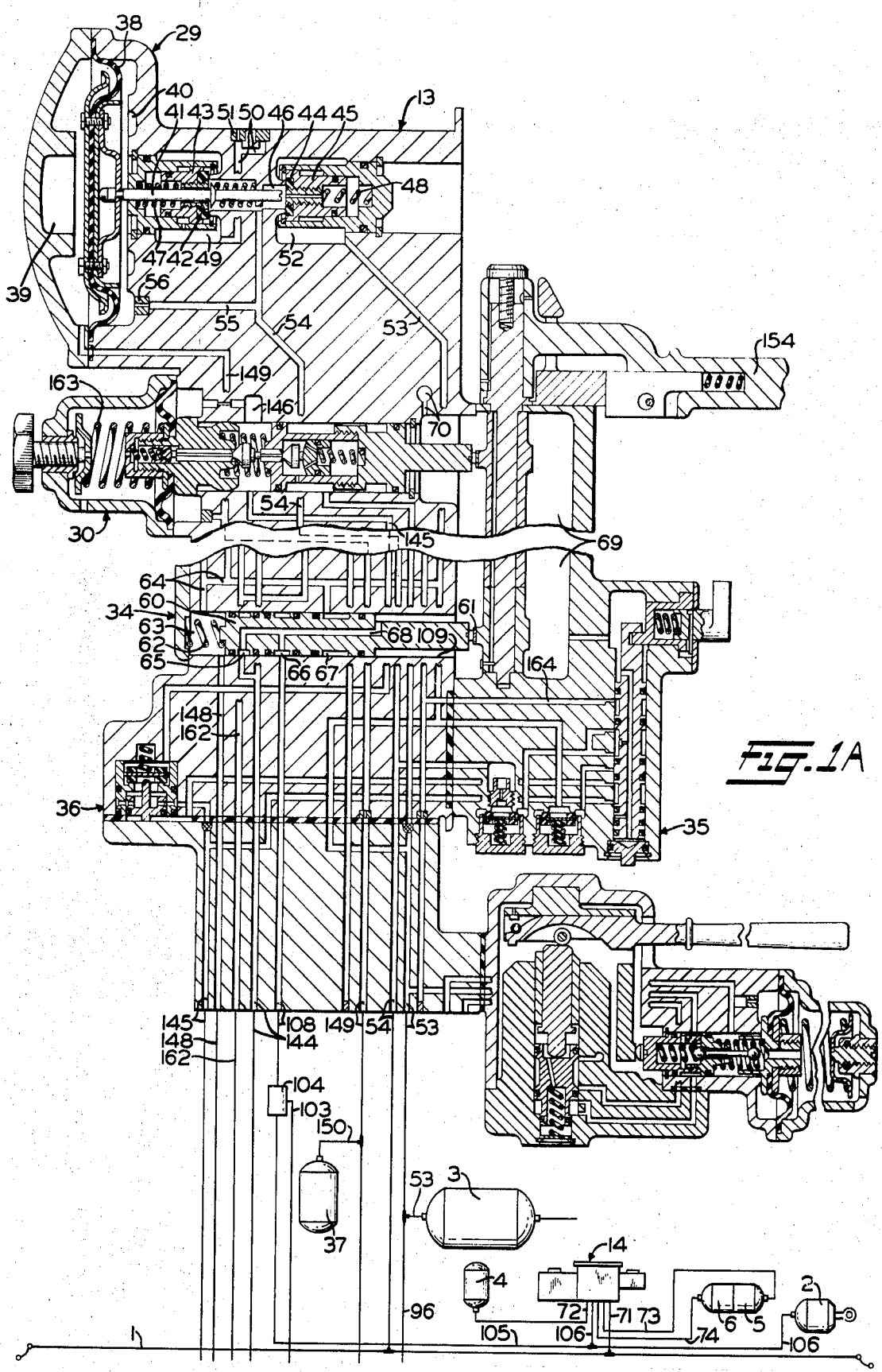

United States Patent [19]
Brown

[11] 3,782,782
[45] Jan. 1, 1974

[54] COMBINED OVERSPEED AND SAFETY INTERLOCK FOR VEHICLE CONTROL

[75] Inventor: Donald Brown, Monroeville, Pa.

[73] Assignee: Westinghouse Air Brake Company, Wilmerding, Pa.

[22] Filed: July 11, 1972

[21] Appl. No.: 270,575

[52] U.S. Cl. .................................... 303/19, 303/20
[51] Int. Cl. ............................................ B60t 7/12
[58] Field of Search ................................. 303/18–20

[56] References Cited
UNITED STATES PATENTS

| | | | |
|---|---|---|---|
| 2,548,674 | 4/1951 | McClure et al. | 303/18 |
| 3,136,586 | 6/1964 | Rush | 303/19 |
| 3,160,444 | 12/1964 | Linhart | 303/19 |
| 3,160,445 | 12/1964 | Wilson | 303/19 |
| 3,623,777 | 11/1971 | Sarbach | 303/19 |

Primary Examiner—Duane A. Reger
Attorney—Ralph W. McIntire, Jr. et al.

[57] ABSTRACT

This invention relates to fluidically operable vehicle overspeed and safety control apparatus which requires periodic acknowledging operations by the vehicle operator to forestall a penalty brake application which would be automatically effected should the operator fail to reduce the speed of the vehicle to the maximum allowable speed or perform the required acknowledging operation within a certain time subsequent to the sounding of an alarm signal or whistle. This apparatus requires that the operator successively, within a chosen time interval following one and then the other of two successive alarms, manually close and thereafter open a sensing or vent port from a back pressure switch abutment-operated logic valve device to prevent the occurrence of a brake application which would automatically occur should he fail to close and thereafter open the vent port in the prescribed timed sequence, or should he become incapacitated.

13 Claims, 2 Drawing Figures

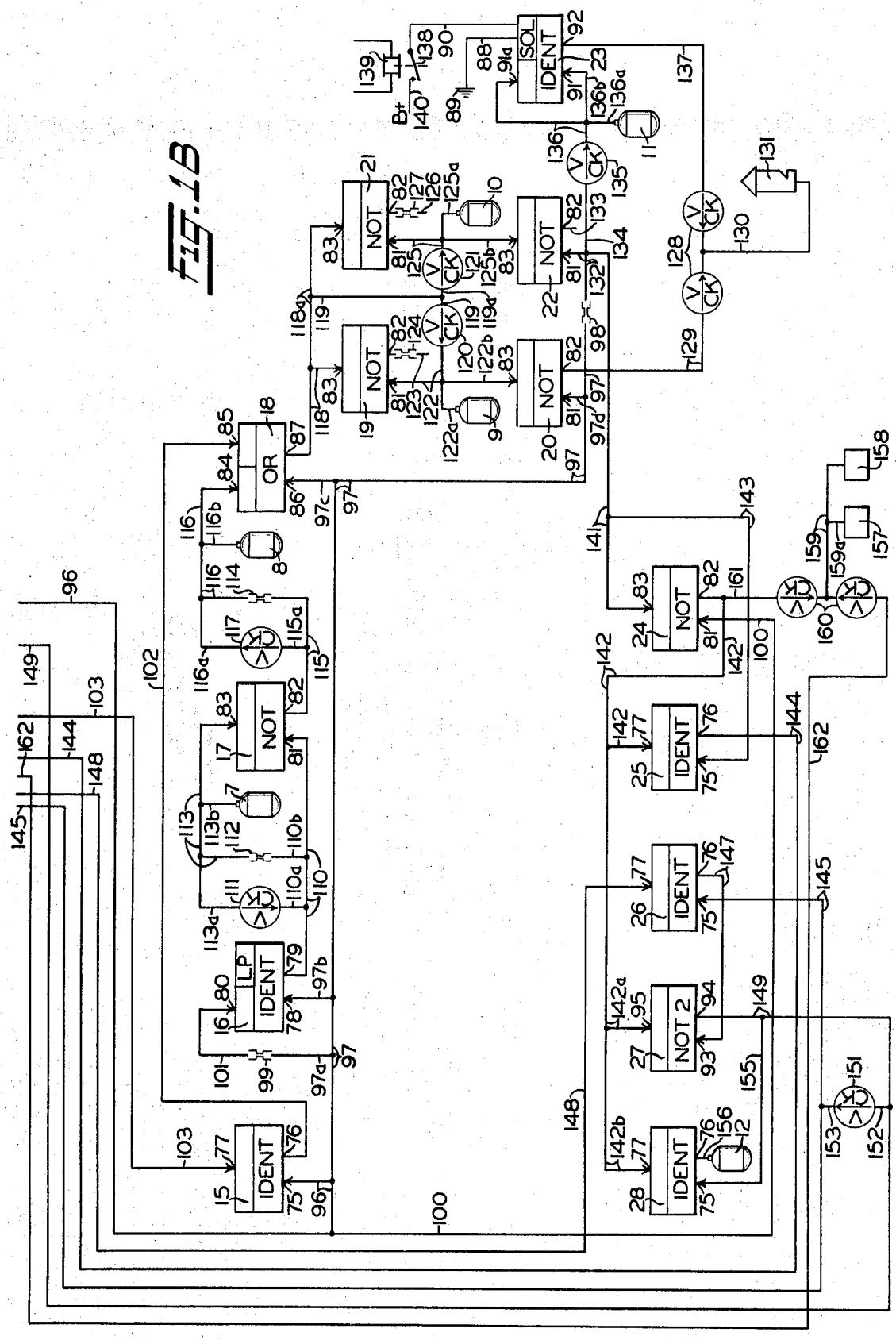

COMBINED OVERSPEED AND SAFETY INTERLOCK FOR VEHICLE CONTROL

BACKGROUND OF THE INVENTION

It has been found that vehicle operators, when they so choose, intentionally, though against the rules and regulations for safe vehicle operation, eliminate by various non-prescribed means, the occurrence of a so-called automatic overspeed or safety control brake application should the speed of the vehicle exceed the maximum allowable safe speed or the operator become incapacitated.

Accordingly, it is the general purpose of this invention to provide a combined overspeed and safety control apparatus that requires periodic acknowledging operations by a vehicle operator in a certain timed sequence to prevent a brake application on the vehicle, it being understood that such a brake application will be automatically effected upon either the vehicle speed exceeding the maximum allowable speed and the subsequent failure of the operator to reduce the vehicle speed to the allowable speed, or failure of the operator to continue the required periodic acknowledging operations in the proper timed sequence.

SUMMARY OF THE INVENTION

According to the present invention, a combined overspeed and safety control apparatus that requires periodic acknowledging operation by a vehicle operator embodies a plurality of small and inexpensive fluid pressure operated logic valve devices so interlocked with a manually operated brake valve and a so-called safety control pipe, the release of fluid under pressure from which is effective to cause a brake application, that a brake application is automatically effected upon failure of the operator to reduce the speed of the vehicle upon vehicle speed exceeding an allowable maximum speed, or to continue manual closing and thereafter opening in the proper timed sequence a sensing or vent port of a certain one of the plurality of logic valve devices.

In the accompanying drawings:

FIGS. 1A and 1B, when taken together such that the lower edge of FIG. 1A is matched with the upper edge of FIG. 1B, constitute a diagrammatic view of a combined overspeed and safety control brake apparatus embodying the invention.

Referring to the drawings, a vehicle combined overspeed and safety control apparatus embodying the invention comprises a brake pipe 1 that extends from end to end of the vehicle and back through each trailing vehicle that may be hauled thereby, a brake cylinder 2, a main reservoir 3, an auxiliary reservoir 4, a control reservoir 5, a selector volume reservoir 6, six volume reservoirs denoted by the numerals 7, 8, 9, 10, 11 and 12 each of which is associated with a logic valve device hereinafter described, a manually operated automatic brake valve device 13 (FIG. 1A) for controlling the pressure in the brake pipe 1, a brake control valve 14 connected to the brake pipe 1 and controlled by variations in pressure therein, and a logic valve assembly comprising fourteen logic valve devices denoted by the numerals 15, 16, 17, 18, 19, 20, 21, 22, 23, 24, 25, 26, 27 and 28.

The manually-operated automatic brake valve device 13 (FIG. 1A) may be of the self-lapping type such as that disclosed in U.S. Pat. No. 2,958,561, issued Nov. 1, 1960 to Harry C. May, and assigned to the assignee of the present application.

The brake valve device 13 comprises a relay valve 29, a self-lapping regulating or control valve 30, a suppression valve 34, a cut-off valve 35 and an equalizing reservoir cut-off valve 36 that is operated to an open position by fluid under pressure supplied thereto while the cut-off valve 35 occupies the position in which it is shown in FIG. 1A to provide for charging of an equalizing reservoir 37 by the supply of fluid under pressure thereto from the regulating valve 30.

Relay valve 29 comprises a diaphragm 38, which is subject opposingly to fluid pressures in a chamber 39 and a chamber 40 and is adapted through the medium of a coaxially arranged operating stem 41 to effect unseating of a disc-shaped exhaust valve 42 carried by an annular valve member 43, or effect unseating of a disc-shaped supply valve 44 carried by a coaxially arranged annular valve member 45, according to whether pressure in chamber 39 is less than or exceeds the pressure in chamber 40. Stem 41 is coaxially connected to the chamber 40 side of diaphragm 38 and projects centrally through valve member 43 and through a chamber 46 and is adapted to abut one end of supply valve member 45. Helical springs 47, 48 urge the valve members 43, 45 toward each other for normally concurrently seating the valves 42, 44. Exhaust valve 42 controls communication between chamber 46 and a chamber 49 which is open to atmosphere via a passageway 50 and an exhaust choke 51; whereas supply valve 44 controls communication of chamber 46 with a supply chamber 52 that is always open to the main reservoir 3 via a passageway and correspondingly numbered pipe 53.

The chamber 46 is connected to the brake pipe 1 via a passageway and correspondingly numbered pipe 54 having disposed in this passageway a brake pipe cut-off valve (not shown) and a vent valve (not shown) since these valves form no part of the present invention. A passageway 55 in the brake valve device 13 opens at one end into the passageway 54 and at the other end into the chamber 40 of the relay valve 29 via a choke 56. It will be understood that the brake pipe cut-off valve and the vent valve which are not shown in the drawings operate in the same manner as the vent valve and emergency valve shown and described in the above-mentioned U.S. Pat. No. 2,958,561.

The suppression valve 34 comprises a spool-type suppression valve 60 that is biased into operative contact with an operating cam 61 by a spring 62 and fluid under pressure supplied to a chamber 63 from the main reservoir 3 via the pipe and passageway 53 and a passageway 64 that at one end opens into the chamber 63 and at the other into the passageway 53 intermediate the ends thereof. Intermediate its ends the spool valve 60 is provided with three spaced-apart elongated peripheral annular grooves 65, 66 and 67. The grooves 65 and 66 are always open to atmosphere via a passageway 68 in the valve 60 and a chamber 69 in the brake valve device 13 which chamber is open to the exterior of this brake valve device via a passageway 70.

The construction and operation of the brake control valve 14 (FIG. 1A) may be the same as that of the brake control valve 3 shown and described in U.S. Pat. No. 2,937,906, issued May 24, 1960 to Harry C. May, and assigned to the assignee of the present invention, and since this control valve forms no part of the present invention, a further description is believed to be unnecessary. It should be noted, however, that this brake control valve 14 is connected to: (1) the brake pipe 1 by a branch pipe 71, (2) the auxiliary reservoir 4 by a pipe 72, (3) the control reservoir 5 by a pipe 73, and (4) the selector volume reservoir 6 by a pipe 74.

The logic valve devices 15, 25, 26 and 28 (FIG. 1B) may be of the IDENTITY type such as that disclosed by FIG. 1 in U.S. Pat. No. 3,653,408, issued Apr. 4, 1972 to Ronald W. Coiner, and assigned to the assignee of the present application.

The IDENTITY type valve device 15 comprises a diaphragm to one side of which fluid under pressure may be supplied to effect deflection of this diaphragm against the force of a spring disposed on the opposite side upon the fluid pressure force exceeding the force of the spring. This deflection of the diaphragm is effective to open a diaphragm-type valve to provide a communication between a supply port 75 and a delivery port 76 only while fluid under pressure is supplied to a control port 77, the diaphragm in its deflected position cooperating with a valve seat to close communication between the delivery port 77 and atmosphere. In the absence of the supply of fluid under pressure to the control port 77, the diaphragm is unseated from its valve seat whereupon the delivery port 76 is cut off from the supply port 75 and opened to atmosphere.

Each of the IDENTITY type valve devices 25, 26 and 28 has the same construction and operation as the valve device 15 except no spring is provided to prevent deflection of the diaphragm until a chosen pressure is built up at the control port 77.

The logic valve device 16 may be of the IDENTITY type such as that disclosed in U.S. Pat. No. 3,601,155, issued Aug. 24, 1971 to Donald Brown, and assigned to the assignee of the present application.

Briefly, as explained in U.S. Pat. No. 3,601,155, the valve device 16 comprises a diaphragm-type valve operative by the cooperative relationship of two diaphragms to provide a communication between a supply port 78 and a delivery port 79. Fluid under pressure supplied to a fluid pressure control port 80 flows to a chamber at an upper side of one diaphragm via two chokes of the same size in series and to a chamber at an upper side of the other diaphragm via a third choke that is the same size as the other two. The chamber at the lower side of each diaphragm is open to atmosphere and the chamber at the upper side of the other diaphragm is connected to the lower side of the one diaphragm via a passageway having a valve seat at its end adjacent the lower side of the one diaphragm. The chamber at the upper side of the one diaphragm is open to atmosphere via a choke the size of which is greater than the size of the two chokes in series that supply fluid under pressure to this chamber and also via a sensing port that may be closed by such as a finger of an operator to cause build up of a pressure that effects downward deflection of the one diaphragm into seating relationship with the valve seat to cut off the release of fluid under pressure from the upper side of the other diaphragm to atmosphere thereby effecting a build up of pressure on this upper side of the other diaphragm.

The build up of pressure on the upper side of this other diaphragm causes it to operate the diaphragm-type valve of the valve device 16 to cut off the delivery port 79 from atmosphere and establish a communication between the supply port 78 and this delivery port 79 so long as the operator maintains the sensing port of this valve device 16 closed by means such as his finger. Upon the operator removing his finger from this sensing port of the valve device 16, the communication between its supply port 78 and its delivery port 79 will be closed and this delivery port 79 opened to atmosphere.

The logic valve devices 17, 19, 20, 21, 22 and 24 may be of the NOT type such as that disclosed by FIG. 2 in the abovementioned U.S. Pat. No. 3,653,408.

Each of the NOT type valve devices 17, 19, 20, 21, 22 and 24 comprises a diaphragm-operated three-way valve that is operative to provide a communication between a supply port 81 and a delivery port 82 in the absence of the supply of fluid under pressure to a control port 83. Upon the supply of fluid under pressure to this control port 83, the communication between the supply port 81 and the delivery port 82 is closed and the delivery port 82 is opened to atmosphere.

The logic valve device 18 may be of the OR type that may be constructed by replacing the upper section 2 of the IDENTITY type logic valve device 1 shown in FIG. 1 of the abovementioned U.S. Pat. No. 3,653,408 with the structure shown in FIG. 6 of this patent.

The OR type valve device 18 comprises two spaced-apart coaxial diaphragms operative upon the simultaneous supply of fluid under pressure to two control ports 84 and 85 that are each connected by a separate passageway to the corresponding side of one of the two diaphragms, or the supply of fluid under pressure to only either one of the control ports 84 or 85 to cause a diaphragm-type valve to establish a communication between a supply port 86 and a delivery port 87. In the absence of the supply of fluid under pressure to the two control ports 84 and 85, the communication between the supply port 86 and the delivery port 87 is closed and this delivery port 87 is opened to atmosphere.

The logic valve device 23 may be of the IDENTITY type that may be constructed by replacing the upper section 2 of the IDENTITY type logic valve device 1 shown in FIG. 1 of the above-mentioned U.S. Pat. No. 3,653,408 with the solenoid-operated logic valve device 50 shown in FIG. 4 of this patent, reversing the polarity of the coil 52 of this solenoid valve device 50 which is of the D. C. type, and adding a spring for biasing the diaphragm 45 of FIG. 4 into seating contact with the seat 42 while the hereinafter-described circuit for the coil 52 is deenergized. One end of the coil of the solenoid of the valve device 23, constructed as described above, has one end of a wire 88 (FIG. 1B) connected thereto, the opposite end of this wire 88 being connected to ground as indicated by the reference numeral 89. The other end of this solenoid coil has one end of a wire 90 connected thereto, the other end of this wire 90 being connected to the hereinafter-described circuit mentioned above.

The IDENTITY type logic valve 23, when constructed as described above, further comprises a second diaphragm for operating a diaphragm-type valve that, when unseated, establishes a communication between a supply port 91 and a delivery port 92. Fluid under pressure supplied to one side of this second diaphragm via a control port 91a establishes a fluid pressure force on one side thereof to cause unseating of the valve when, subsequent to deenergization of the solenoid in a manner hereinafter described, the spring biases the first diaphragm into contact with its seat (seat 42 in U.S. Pat. No. 3,653,408) to prevent the release of fluid under pressure from the one side of this second diaphragm to atmosphere.

The logic valve device 27 may be of the NOT-2 type comprising a two-way valve device and is similar in construction to the logic valve disclosed by FIG. 1 in the above-mentioned U.S. Pat. No. 3,653,408 except that its diaphragm-operated valve is operative to provide a communication between a supply port 93 and a delivery port 94 only in the absence of the supply of fluid under pressure to a control port 95. This valve device does not provide for exhausting delivery port 94 to atmosphere when fluid under pressure is present at the control port 95.

Connected to the supply port 75 of the valve device 15 is one end of a pipe 96 the opposite end of which is connected to the pipe 53 that in turn is connected to the main reservoir 3. Connected to the pipe 96 intermediate the ends thereof is one end of a pipe 97 the opposite end of which is connected to the inlet end of a fixed resistance or choke 98. The pipe 97 is connected to: (1) the inlet of a choke 99 by a branch pipe 97a, (2) the supply port 78 of the valve device 16 by a branch pipe 97b, (3) the supply port 86 of the valve device 18 by a branch pipe 97c, and (4) the supply port 81 of the valve device 20 by a branch pipe 97d. Also connected to the pipe 96 intermediate the ends thereof is one end of a pipe 100 the opposite end of which is connected to the supply port 81 of the valve device 24. Consequently, the supply port of the valve devices 15, 16, 18, 20 and 24 is constantly supplied with fluid under pressure from the main reservoir 3.

The outlet of the above-mentioned choke 99 is connected to the control port 80 of the valve device 16 by a pipe 101 so that this supply port 80 is supplied with fluid under pressure at a rate and a pressure dependent upon the size of the choke 99. Consequently, the size of the choke 99 is so selected that the pressure of the fluid after passing through this choke 99, then through the hereinbefore-mentioned two chokes in series within this valve device 16 and thereafter to atmosphere via the sensing port of this valve device 16 is sufficiently low as not to produce discomfort to an operator when he closes this sensing port by means such as one of his fingers.

The delivery port 76 of the valve device 15 is connected to the control port 85 of the valve device 18 by a pipe 102 and the control port 77 of this valve device 15 is connected by a pipe 103 to the side outlet of a double check valve device 104 (FIG. 1A). Connected to one inlet of the double check valve device 104 is one end of a pipe 105 the opposite end of which is connected to a pipe 106 intermediate the ends thereof. One end of the pipe 106 is connected to the brake cylinder 2 and the opposite end is connected to the brake cylinder port of the brake control valve 14 that is connected to the brake pipe 1 by the pipe 71.

Connected to the other inlet of the double check valve device 104 is one end of a pipe 108 that is connected to a correspondingly numbered passageway in the brake valve device 13 that opens at the wall surface of a bore 109 in which the suppression valve 60 is slidably disposed. While this suppression valve 60 occupies its release position in which it is shown in FIG. 1A, the end of the passageway 108 registers with the groove 66 on this valve 60. Consequently, the control port 77 of the valve device 15 is open to atmosphere via pipe 103, double check valve device 104, pipe and passageway 108, groove 66, passageway 68, bore 109, chamber 69 and passageway 70 so long as the suppression valve 60 occupies its release position shown in FIG. 1A and no fluid under pressure is present in the brake cylinder 2. Accordingly, the communication between the supply port 75 and the delivery port 76 of the valve device 15 is closed and this delivery port 76 opened to atmosphere.

The delivery port 79 of the valve device 16 is connected to the supply port 81 of the valve device 17 by a pipe 110. A branch pipe 100a connects the pipe 110 to the outlet of a check valve 111 and a branch pipe 110b connects this pipe 110 to one end of a choke 112. The opposite end of this choke 112 is connected to the control port 83 of the valve device 17 by a pipe 113. A branch pipe 113a connects the pipe 113 to the inlet of the check valve 111 and a branch pipe 113b connects this pipe 113 to the hereinbefore-mentioned volume reservoir 7. The check valve 111 and the choke 112 provide for a slow rate of supply of fluid under pressure to the volume reservoir 7 and the control port 83 of the valve device 17 and a rapid rate of release of fluid under pressure therefrom to atmosphere via the valve device 16 while the hereinbefore-mentioned sensing port of this valve device is open.

The delivery port 82 of the valve device 17 is connected to one end of a choke 114 by a pipe 115 and the other end of this choke 114 is connected to the control port 84 of the valve device 18 by a pipe 116. A branch pipe 115a connects the pipe 115 to the inlet of a check valve 117 the outlet of which is connected to the pipe 116 by a branch pipe 116a. The hereinbefore-mentioned volume reservoir 8 is connected to the pipe 116 by a branch pipe 116b. The check valve 117 and the choke 114 provide for a rapid rate of flow of fluid under pressure to the volume reservoir 8 and the control port 84 of the valve device 18 and a slow rate of release of fluid under pressure therefrom to atmosphere via the valve device 17 so long as the pressure at the control port 83 is sufficient to cause this valve device 17 to close communication between its supply port 81 and its delivery port 82 and open delivery port 82 to atmosphere.

The delivery port 87 of the valve device 18 is connected to the control port 83 of the valve device 19 by a pipe 118 and to the control port 83 of the valve device 21 by a branch pipe 118a. One end of a pipe 119 is connected to the branch pipe 118a intermediate the ends thereof and the opposite end is connected to the inlet of a check valve 120. A branch pipe 119a connects the pipe 119 to the inlet of a second check valve 121.

The outlet of the check valve 120 is connected by a pipe 122 to the supply port 81 of the valve device 19 the delivery port 82 of which is connected to atmosphere via a pipe 123 having therein a choke 124. The size of this choke 124 determines the rate of release of fluid under pressure from the hereinbefore-mentioned volume reservoir 9 which is connected to the pipe 122 by a branch pipe 122a, and from the control port 83 of the valve device 20, which control port is connected to the pipe 122 by a branch pipe 122b, upon the release of fluid under pressure from the control port 83 of the valve device 19 to atmosphere via the pipe 118 and the delivery port 87 of the valve device 18 which delivery port is open to atmosphere in the absence of the supply of fluid under pressure to both of the control ports 84 and 85 of the valve device 18.

The outlet of the above-mentioned check valve 121 is connected by a pipe 125 to the supply port 81 of the valve device 21 the delivery port 82 of which is connected to atmosphere via a pipe 126 having therein a choke 127, the diameter of which is less than the diameter of the abovementioned choke 124 to provide for the sounding of an alarm a predetermined length of time prior to the occurrence of a safety control or overspeed brake application, thereby providing the operator of the vehicle, if he is not incapacitated, the opportunity to suppress or prevent the occurrence of this brake application in the manner hereinafter described.

The hereinbefore-mentioned volume reservoir 10 is connected to the pipe 125 by a branch pipe 125a and the control port 83 of the valve device 22 is connected to this pipe 125 by a branch pipe 125b.

As shown in FIG. 1B of the drawings, the delivery port 82 of the valve device 20 is connected to the left-hand end of a double check valve device 128 by a pipe 129, and the outlet of this double check valve device is connected by a pipe 130 to an alarm device which, for example, may be a fluid pressure operated whistle 131.

As further shown in FIG. 1B, the right-hand end or outlet of the hereinbefore-mentioned choke 98 is connected by a socalled safety control pipe 132 to the supply port 81 of the valve device 22, the delivery port 82 of which is open directly to atmosphere via a short pipe 133 to provide for the release of fluid under pressure from the safety control pipe 132 to atmosphere at a faster rate than it can be supplied through the choke 98, upon operation of the valve device 22 to provide a communication between its supply port 81 and its delivery port 82. It should be understood that this release of fluid under pressure from the safety control pipe 132 is effective to cause a service brake application on the vehicle and any trailing vehicles hauled thereby in a manner hereinafter explained.

Intermediate its ends, the safety control pipe 132 has connected thereto one end of a pipe 134 that has its opposite end connected to the inlet of a check valve 135. The outlet of this check valve 135 is connected to the hereinbeforementioned control port 91a of the valve device 23 by a pipe 136. A branch pipe 136a connects the pipe 136 to the hereinbefore-mentioned volume reservoir 11 and a second branch pipe 136b connects this pipe 136 to the supply port 91 of the valve device 23. The delivery port 92 of this valve device 23 is connected by a pipe 137 to the right-hand end of the hereinbefore-mentioned double check valve device 128, as shown in FIG. 1B. The other end of the hereinbefore-mentioned wire 90 that is connected to the solenoid coil of this valve device 23 is connected to one terminal of a normally picked-up contact 138 of an overspeed relay 139 which is deenergized to effect opening of this contact 138 upon the speed of the internal combusion engines of the vehicle exceeding a chosen speed. While the contact 138 is in its picked-up position, it establishes a circuit between the wire 90 and one end of a wire 140 that is connected to the positive terminal of any suitable source of direct current power on the vehicle. From the foregoing, it is apparent that so long as the speed of the internal combustion engines is less than a chosen value, the contact 138 is closed to establish a power supply circuit to the solenoid of the valve device 23 so that the supply port 91 of this device 23 is cut off from its delivery port 92 and this port 92 opened to atmosphere.

It will be noted from FIG. 1B of the drawings that one end of a pipe 141 is connected to the hereinbefore-mentioned safety control pipe 132 intermediate the ends thereof and the opposite end of this pipe 141 is connected to the control port 83 of the valve device 24. The delivery port 82 of this valve device 24 is connected to: (1) the control port 77 of the valve device 25 by a pipe 142, (2) the control port 95 of the valve device 27 by a branch pipe 142a connected to the pipe 142 intermediate the ends thereof, and (3) the control port 77 of the valve device 28 by a branch pipe 142b that is connected to the branch pipe 142a intermediate the ends thereof.

Connected to the supply port 75 of the valve device 25 is one end of a pipe 143 that has its opposite end connected to the pipe 141 intermediate the ends thereof. Connected to the delivery port 76 of this valve device 25 is one end of a pipe 144 that is connected to a correspondingly numbered passageway in the brake valve device 13 (FIG. 1A) that opens at the wall surface of the bore 109 at a location that, while the suppression valve 60 occupies its release position shown, registers with the groove 65 on this valve 60. Consequently, the delivery port 76 (FIG. 1B) of the valve device 26 is open to atmosphere via the pipe and passageway 144, groove 65, passageway 68, bore 109, chamber 69 and passageway 70 so long as the suppression valve 60 occupies its release position shown in FIG. 1A, it being understood that the supply port 75 (FIG. 1B) of this valve device 25 is cut off from delivery port 76 in the absence of the supply of fluid under pressure to the control port 77 of this valve device.

Connected to the supply port 75 of the valve device 26 is one end of a pipe 145 that is connected to a correspondingly numbered passageway in the brake valve device 13 (FIG. 1A) that extends via the equalizing reservoir cut-off valve 36 to a delivery chamber 146 in the regulating valve 30 of the brake valve device 13. Connected to the delivery port 76 (FIG. 1B) of the valve device 26 is one end of a pipe 147 that has its opposite end connected to the supply port 93 of the valve device 27, and connected to the control port 77 of this valve device 26 is one end of a pipe 148 that is connected to a correspondingly numbered passageway in the brake valve device 13 (FIG. 1A) that opens into the chamber 63 at the wall surface of the bore 109 at a location that is on the left-hand side of the suppression valve 60 while this valve occupies its release position shown in FIG. 1A.

Connected to the delivery port 94 (FIG. 1B) of the valve device 27 is one end of a pipe 149 that is connected to a correspondingly numbered passageway in the brake valve device 13 (FIG. 1A) that opens into the hereinbefore-mentioned chamber 39 of the relay valve 29 of this brake valve device. The hereinbefore-mentioned equalizing reservoir 37 is connected to the pipe 149 by a pipe 150, and a check valve 151 (FIG. 1B) has its inlet connected to this pipe 149 by a short pipe 152 and its outlet connected to the pipe 145 by a short pipe 153. This check valve 151 provides for effecting reductions of pressure in the equalizing reservoir 37 (FIG. 1A) by moving a handle 154 of the brake valve device 13 arcuately from its release position to a position in its application zone corresponding to the degree of brake application desired.

As shown in FIG. 1B of the drawings, one end of a pipe 155 is connected to the supply port 75 of the valve device 28 and the opposite end is connected to the pipe 149 intermediate the ends thereof. The delivery port 76 of this valve device 28 is connected to the hereinbefore-mentioned volume reservoir 12 by a pipe 156. The size of this reservoir 12 is such that when the equalizing reservoir 37 (FIG. 1A) and the chamber 39 in the relay valve 29 of the brake valve device 13 are connected thereto in a manner hereinafter explained, the resulting equalizing pressure in the chamber 39 is sufficient to cause the relay valve 29 to operate to reduce the pressure in the brake pipe 1 the amount required to cause a full service brake application.

If it be assumed that the vehicle is driven by electric motors and is provided with a dynamic brake, in order to provide for power knock out and cut out of the dynamic brake upon the occurrence of an overspeed or a safety control brake application or upon manually moving the handle 154 of the brake valve device 13 to its emergency position, a power cut-off switch 157 (FIG. 1B) and a dynamic brake cut-out switch 158 are provided. A pipe 159 connects the dynamic brake cut-out switch 158 to the side outlet of a double check valve device 160 and a branch pipe 159a connects the power cut-off switch 157 to the pipe 159 intermediate the ends thereof. One inlet of the double check valve device 160 is connected to the pipe 142 by a pipe 161. Connected to the other inlet of this double check valve device 160 is is one end of a pipe 162 that is connected to a correspondingly numbered passageway in the brake valve device 13 (FIG. 1A) that leads to the emergency valve (not shown) of the brake valve device 13, it being understood that this emergency valve forms no part of the present invention. Briefly, however, this emergency valve is operative to supply fluid under pressure to the pipe 162 upon movement of the handle 154 to its emergency position. Fluid under pressure thus supplied to the pipe 162 flows via the double check valve device 160 (FIG. 1B), the pipe 159 and branch pipe 159a to the power cut-off switch 157 to cause cut off of the supply of electrical current to the driving motors of the vehicle, and to the dynamic brake cut-out switch 158 so that the dynamic brake is sumultaneously cut out.

OPERATION

To initially charge the combined overspeed and safety control equipment shown in FIGS. 1A and 1B of the drawings, internal combustion engines are started for operating fluid compressors (not shown) to effect charging of the main reservoir 3 (FIG. 1A).

As the main reservoir 3 is thus charged, fluid under pressure will flow therefrom via pipes and passageways here-inbefore described to: (1) the supply port 75 (FIG. 1B) of the valve device 15, (2) the supply port 78 of the valve device 16, (3) the supply port 86 of the valve device 18, (4) the supply port 81 of the valve devices 20 and 24, and (5) the inlet side of the choke 98.

Furthermore, while the handle 154 (FIG. 1A) of the brake valve 13 is in its release position, the suppression valve 60 will occupy the position shown in FIG. 1A. Consequently, fluid under pressure will flow from the main reservoir 3 to the chamber 63 and thence via passageway and pipe 148 to the control port 77 (FIG. 1B) of the valve device 26 to cause operation of this valve device to establish a communication between the supply port 75 and the delivery port 76 of this valve device.

Moreover, the regulating valve 30 (FIG. 1A) will operate to supply fluid under pressure from the main reservoir 3 to the supply port 75 (FIG. 1B) of the valve device 26 via passageway and pipe 145 and thence to the supply port 93 of the valve device 27 via the now open valve device 26 and pipe 147.

Since no fluid under pressure is present at the control port 83 of the valve device 22 at this time, the fluid under pressure supplied to the inlet side of the choke 98 will flow therethrough and thence, at a reduced pressure, unrestricted to atmosphere via pipe 132, the valve device 22 and the short pipe 133. Consequently, there will be no build up of pressure at the control port 83 of the valve device 24 and the supply port 75 of the valve device 25. Therefore, the fluid under pressure supplied from the main reservoir 3 to the supply port 81 of this valve device 24 will flow to the delivery port 82 and thence to: (1) the control port 77 of the valve device 25 via the pipe 142, (2) the control port 95 of the valve device 27 via pipe 142 and branch pipe 142a, and (3) the control port 77 of the valve device 28 via the pipe 142 and branch pipes 142a and 142b.

Since no pressure is being built up at this time at the supply port 75 of the valve device 25, as explained above, the supply of fluid under pressure to the control port 77 of this valve device 25 to operate it to establish a communication between this supply port 75 and the delivery port 76, which is open to atmosphere via pipe and passageway 144 and the suppression valve 60, is without effect.

The supply of fluid under pressure to the control port 95 of the valve device 27 operates it to close communication between its supply port 93 and its delivery port 94. Therefore, the fluid under pressure supplied from the main reservoir 3 to this supply port 93 by operation of the regulating valve 30 of the brake valve device 13 in the manner hereinbefore explained cannot flow to the equalizing reservoir 37 (FIG. 1A) and chamber 39 of relay valve 29 to cause this relay valve to operate to charge the brake pipe 1 at this time.

The supply of fluid under pressure to the control port 77 of the valve device 28 operates it to open a communication between its supply port 75 and its delivery port 76 but since the communication between the supply port 93 and the delivery port 94 of the valve device 27 is closed, as explained above, no fluid under pressure is supplied to the volume reservoir 12 at this time.

Since no fluid under pressure is supplied to the control port 83 of the valve device 20 at this time, a communication is established between its supply port 81 and its delivery port 82. Consequently, the fluid under pressure supplied from the main reservoir 3 to this supply port 81, as hereinbefore stated, will flow through this valve device 20 to its delivery port 82 and thence to the whistle 131 to sound an alarm via pipe 129, double check valve device 128 and pipe 130.

The operator of the vehicle, at the time the whistle 131 sounds the above-mentioned alarm, in order to silence it, and to prevent a safety control brake application in a manner hereinafter explained, will place one of his fingers over the hereinbefore-mentioned sensing port in the valve device 16 to prevent the escape of fluid under pressure via this port.

The valve device 16 will now operate in the manner described in hereinbefore-mentioned U.S. Pat. No. 3,601,155 to establish a communication between its supply port 78 and its delivery port 79, it being noted that the fluid under pressure supplied from the main reservoir 3 (FIG. 1A) to this supply port 78 (FIG. 1B) is also supplied to the control port 80 via branch pipe 97a, choke 99 and pipe 101 to cause operation of this valve device subsequent to the operator closing its sensing port.

Upon the establishment of a communication between the supply port 78 and delivery port 79 of the valve device 16, fluid under pressure will flow from the main reservoir 3 (FIG. 1A) to this delivery port 79 (FIG. 1B) and thence to: (1) the supply port 81 of the valve device 17 via pipe 110, (2) the control port 83 of this valve device 17 via pipe 110, branch pipe 110b, choke 112 and pipe 113, and (3) volume reservoir 7 via branch pipe 113b which is connected to the pipe 113.

Fluid under pressure thus supplied to the supply port 81 of the valve device 17 flows therethrough to its delivery port 82 until the pressure at the control port 83 builds up sufficiently to operate this valve device to close the communication between its supply port 81 and its delivery port 82 and open port 82 to atmosphere. The period of time that the communication between this supply port 81 and delivery port 82 is open is dependent upon the size of the choke 112, the volume of reservoir 7 and the resistance to deflection of the operating diaphragm of the valve device 17. It will be understood, however, that the time that the communication between the supply port 81 and delivery port 82 of the valve device 17 is open is long enough to provide for operation of the valve device 18 in the manner now to be described.

Fluid under pressure supplied to the delivery port 82 of the valve device 17 flows at an unrestricted rate to: (1) the control port 84 of the valve device 18 via pipe 115, branch pipe 115a, check valve 117, branch pipe 116a and pipe 116, and (2) volume reservoir 8 which is connected to the pipe 116 by the branch pipe 116b.

When the pressure at the control port 84 of the valve device 18 is built up sufficiently to deflect that one of the two diaphragms of this valve device that is subject to this pressure, this valve device 18 operates to establish a communication between its supply port 86 and its delivery port 87. It will be noted that since fluid under pressure is supplied simultaneously to the control port 84 and the volume reservoir 8, the size of this reservoir determines the time required for the pressure at this control port 84 to reach the value necessary to deflect the above-mentioned diaphragm to operate the valve device 18 to establish the communication between its supply port 86 and its delivery port 87.

Assume that the operator maintains the sensing port in the valve device 16 closed a sufficient length of time for fluid under pressure to be supplied from the supply port 78 of this valve device to its delivery port 79 and thence to the control port 83 of the valve device 17 to build up sufficient pressure at this control port 83 to operate valve device 17 to close the communication between its supply port 81 and its delivery port 82 and open this delivery port 82 to atmosphere.

It should be noted that if the operator maintains this sensing port closed for any period of time in excess of the above-mentioned sufficient or minimum length of time required for fluid under pressure to be supplied from the port 78 of valve device 16 to its delivery port 79 and thence, to the control port 83 of the valve device 17 to cause operation of this valve device 17, the time of operation of this valve device 17 is not effected but remains the same. Hence the operator cannot nullify the safety control system by permanently closing or plugging this sensing port in the valve device 16.

When the delivery port 82 of the valve device 17 is opened to atmosphere, as explained above, fluid under pressure will flow from the control port 84 of the valve device 18 and the volume reservoir 8 to atmosphere at a rate determined by the size of the choke 114. Accordingly, it will be understood that the size of the choke 114 and the volume of reservoir 8 determine the length of time required for the pressure at the control port 84 of valve device 18 to be reduced to the value at which this valve device 18 operates to close the communication between its supply port 86 and its delivery port 87 and open this delivery port 87 to atmosphere.

If the operator does not maintain the sensing port in the valve device 16 closed long enough to cause the valve device 17 to operate to open its delivery port 82 to atmosphere, as described, above, it will be understood that, when he opens this sensing port in the valve device 16, the delivery port 79 of this valve device 16 is opened to atmosphere whereupon fluid under pressure will flow from the control port 84 of the valve device 18 and the volume reservoir 8 to atmosphere via pipes 116 and 116b, choke 114, pipe 115, the valve device 17, pipe 110 and the valve device 16. Accordingly, it is apparent that the operator cannot render inoperative or nullify the safety control system by not maintaining the sensing port of valve device 16 closed long enough to cause the valve device 17 to operate to open its delivery port 82 to atmosphere.

While the communication is established between the supply port 86 and the delivery port 87 of the valve device 18, fluid under pressure from the main reservoir 3 flows through this valve device to its delivery port 87 and thence to: (1) control port 83 of valve device 19 via pipe 118, (2) control port 83 of valve device 21 via pipe 118 and branch pipe 118a, (3) supply port 81 of valve device 19 via pipe 118, branch pipe 118a, pipe 119, check valve 120, and pipe 122, (4) volume reservoir 9 which is connected to pipe 122 by branch pipe 122a, (5) control port 83 of valve device 20 which is connected to pipe 122 by branch pipe 122b, (6) supply port 81 of valve device 21 via pipe 118, branch pipe 118a, pipe 119, branch pipe 119a, check valve 121 and pipe 125, (7) volume reservoir 10 which is connected to pipe 125 by branch pipe 125a, and (8) control port 83 of valve device 22 which is connected to pipe 125 by branch pipe 125b.

Fluid under pressure supplied to the supply port 81 of the valve device 19 will flow to its delivery port 82 and thence to atmosphere via pipe 123 having choke 124 therein until the pressure of the fluid supplied to the control port of 83 of this valve device 19 is increased sufficiently to operate this valve device 19 to cut off its supply port 81 from its delivery port 82, it being remembered that this port 82 is open to atmosphere via choke 124 which is larger than choke 127.

Likewise, fluid under pressure supplied to the supply port 81 of the valve device 21 will flow to its delivery port 82 and thence to atmosphere via pipe 126 having choke 127 therein until the pressure of the fluid supplied to the control port 83 of this valve device 21 is increased sufficiently to operate this valve device 21 to cut off its supply port 81 from its delivery port 82, it being remembered that this delivery port is open to atmosphere via the smaller choke 127.

It will be noted that, since the choke 127 is smaller than the choke 124 as hereinbefore stated, prior to operation of the valve devices 19 and 21 in the manner described above, pressure in the volume reservoir 10 and at the control port 83 of the valve device 22 will build up faster than the pressure in the volume reservoir 9 and at the control port 83 of the valve device 20. Accordingly, it is apparent that the valve device 22 will operate to close the communication between its supply port 81 and its delivery port 82 prior to operation of the valve device 20 to close communication between its supply port 81 and its delivery port 82 to cut off flow of fluid under pressure to the whistle 131 and stop sounding of the alarm.

Upon operation of the valve device 22 to close communication between its supply port 81 and its delivery port 82, which is open to atmosphere via pipe 133, the fluid under pressure supplied to the pipe 132 via the choke 98 will flow to the pipes 141 and 143 to increase the pressure at the control port 83 of the valve device 24 and at the supply port 75 of the valve device 25.

When the pressure at the control port 83 of valve device 24 has increased sufficiently to effect operation of this valve device, its supply port 81 is cut off from its delivery port 82 and this delivery port is open to atmosphere.

While the delivery port 82 of valve device 24 is thus vented to atmosphere, the control port 77 of the valve devices 25 and 28 and the control port 95 of the valve device 27 are vented to atmosphere. Therefore, at the time the control port 77 of the valve device 28 is thus vented, the valve device 28 operates to close communication between its supply port 75 and its delivery port 76 and open this delivery port 76 and the volume reservoir 12 to atmosphere. Furthermore, at the time the control port 95 of the valve device 27 is thus vented to atmosphere, this valve device operates to establish a communication between its supply port 93 and its delivery port 94. Since fluid under pressure is supplied to this supply port 93 from the regulating valve 30 of the brake valve 13 in the manner hereinbefore described, this fluid under pressure flows through the valve device 27 to its delivery port 94 and thence to the chamber 39 in the relay valve 29 of the brake valve 13 and the equalizing reservoir 37 via pipe and passageway 149 and pipe 150. The relay valve 29 will now operate in the manner described in hereinbefore-mentioned U.S. Pat. No. 2,958,561 to effect the supply of fluid under pressure from the main reservoir 3 to the brake pipe 1 to cause an increase of pressure in brake pipe 1.

When the valve device 18 operates in the manner hereinbefore described to open its delivery port 87 to atmosphere, fluid under pressure will be vented from the control port 83 of each of the valve devices 19 and 21 to atmosphere, it being noted that the check valves 120 and 121 prevent back flow from the volume reservoirs 9 and 10 to atmosphere via the valve device 18.

Upon the pressure at the control port 83 of the valve devices 19 and 21 being reduced to a chosen value, these valve devices operate to establish a communication between their supply port 81 and delivery port 82. Accordingly, the fluid under pressure in the volume reservoir 9 and at the control port 83 of the valve device 20 will reduce at a faster rate via the larger choke 124 than that in the volume reservoir 10 and at the control port 83 of the valve device 22 via the smaller choke 127. Therefore, the valve device 20 will operate to open the communication between its supply port 81 and its delivery port 82 to effect the supply of fluid under pressure to the whistle 131 so that an alarm is sounded before the valve device 22 operates to open the communication between its supply port 81 and delivery port 82, which is open to atmosphere.

If the valve device 22 were allowed to operate to open the communication between its supply port 81 and its delivery port 82, a safety control brake application would occur in a manner hereinafter described.

Accordingly, to prevent the occurrence of a safety control brake application and to continue the charging of the brake pipe 1, the operator, upon hearing the sound of the alarm, that is when the whistle 131 begins to blow as described above, will again place one of his fingers over the sensing port in the valve device 16 whereupon the valve devices 17 and 18 operate in the manner hereinbefore described.

When the valve device 18 is thus operated, a communication is established from its supply port 86 to its delivery port 87 for a chosen length of time to again cause flow of fluid under pressure from the main reservoir 3 to the valve devices 19, 20, 21 and 22 and the reservoirs 9 and 10. Consequently, the valve devices 19, 20 and 21 are operated in the manner hereinbefore described before the pressure in the volume reservoir 10 and at the control port 83 of the valve device 22 is reduced by flow to atmosphere via the smaller choke 127 sufficiently for this valve device 22 to operate to open the communication between its supply port 81 and its delivery port 82 to cause a safety control brake application.

Accordingly, it is apparent that in order to charge the equalizing reservoir 37 and the brake pipe 1 to the normal pressure carried therein which is determined by the degree of compression of a regulating spring 163 (FIG.1A) in the regulating valve 30 of the brake valve device 13, as explained in hereinbefore-mentioned U.S. Pat. No. 2,958,561, the operator, each time the alarm is sounded by blowing of the whistle 131, will immediately place one of his fingers over the sensing port in the valve device 16.

As the brake pipe 1 is thus charged to the normal pressure carried therein, the brake control valve 14 will operate in response thereto, in the manner explained in hereinbefore-mentioned U.S. Pat. No. 2,937,906, to effect charging of the auxiliary reservoir 4, control reservoir 5 and selector volume reservoir 6 to the pressure carried in the brake pipe 1 and the establishment of a communication between the brake cylinder 2 and atmosphere.

The vehicle may now travel from one designation to another provided that each time the alarm is sounded, that is each time the whistle 131 blows, the operator within a short interval of time, such as, for example, 6 seconds, places one of his fingers over the sensing port in the valve device 16 to prevent the occurrence of a safety control brake application in a manner now to be described.

Let it be supposed that at the time the whistle 131 blows, the operator, either willfully or due to being incapacitated, does not place one of his fingers over the sensing port in the valve device 16. Accordingly, the delivery port 79 of this valve device 16 is opened to atmosphere whereupon fluid under pressure is vented from the control port 83 of the valve device 17 and the volume reservoir 7 to atmosphere at an unrestricted rate via pipe 113, branch pipes 113a and 113b, check valve 111, branch pipe 110a, pipe 110 and the valve device 16. Therefore, after a period of time determined by the volume of the reservoir 7, the pressure at the control port 83 of the valve device 17 is reduced sufficiently for this valve device to operate to open its delivery port 82 to atmosphere.

Upon the establishment of a communication between the delivery port 82 of the valve device 17 and atmosphere, fluid under pressure will flow from the control port 84 of the valve device 18 and the volume reservoir 8 to atmosphere via pipe 116, branch pipe 116b, choke 114, pipe 115 and the valve device 17 at a rate controlled by the size of the choke 116. Accordingly, after a period of time determined by the size of the choke 116 and the volume of the reservoir 8, the pressure at the control port 84 of the valve device 18 is reduced sufficiently for this valve device to operate to establish a communication between its delivery port 87 and atmosphere.

As hereinbefore-described, fluid under pressure will now be vented from the control port 83 of each of the valve devices 19 and 21 to atmosphere whereupon these valve devices operate to release fluid under pressure from the control port 83 of the respective valve devices 20 and 22 to atmosphere at different rates corresponding to the size of the respective chokes 124 and 127. Therefore, the valve device 20 will be operated to supply fluid under pressure to the whistle 131 after which the valve device 22 will operate to establish a communication between its supply port 81 and its delivery port 82 which is open directly to atmosphere. Accordingly, fluid under pressure will now flow from the control port 83 of the valve device 24 and the supply port 75 of the valve device 25 to atmosphere via pipes 143, 141 and 132, and the valve device 22 at a faster rate than fluid under pressure is supplied to the pipe 132 via the choke 98. Therefore, the pressure at the control port 83 of the valve device 24 is quickly reduced to cause this valve device to operate to open a communication between its supply port 81 and its delivery port 82.

Since fluid under pressure from the main reservoir 3 is present at the supply port 81, fluid under pressure will now flow through the valve device 24 to: (1) control port 77 of valve device 25 via pipe 142, (2) control port 95 of valve device 27 via pipe 142 and branch pipe 142a, and (3) control port 77 of valve device 28 via pipe 142 and branch pipes 142a and 142b.

The supply of fluid under pressure to the control port 77 of the valve device 25 operates it to establish a communication between its supply port 75 and its delivery port 76 which is open to atmosphere via pipe and passageway 144, groove 65 on and passageway 68 in suppression valve 60, chamber 69 and passageway 70. This operation of the valve device 25 prevents a release of a safely control brake application until handle 154 of the brake valve device 13 is manually moved arcuately from its release to its suppression position.

The supply of fluid under pressure to the control port 95 of the valve device 27 operates it to close communication between its supply port 93 and its delivery port 94 to cut off the supply of fluid under pressure from the regulating valve 30 of the brake valve device 13 to the equalizing reservoir 37 and the chamber 39 in the relay valve 29 of the brake valve device 13 to prevent further supply to this reservoir 37 and chamber 39 which are connected to the volume reservoir 12 by operation of the valve device 28 to establish a communication between its supply port 75 and its delivery port 76 in response to the supply of fluid under pressure to the control port 77 of this valve device 28 in the manner described above.

As hereinbefore stated, the size of the volume reservoir 12 is such that the resulting reduction of pressure in the equalizing reservoir 37 and the chamber 39 is sufficient to cause the relay valve device 29 to operate to reduce the pressure in the brake pipe 1 the amount required to cause a full service brake application, it being understood that the brake control valve device 14 operates in response to this reduction of pressure in the brake pipe 1 to supply fluid under pressure from the auxiliary reservoir 4 to the brake cylinder 2 to cause this full service brake application on the vehicle.

Some of the fluid under pressure supplied to the brake cylinder 2 flows to the control port 77 of the valve device 15 via the pipe 105, double check valve device 104, and pipe 103. Upon the pressure at this control port 77 increasing to a chosen value which, for example, may be 25 pounds per square inch, the diaphragm of this valve device is deflected against its spring to operate the diaphragm-type valve to its open position whereupon the fluid under pressure supplied from the main reservoir 3 to the supply port 75 flows to the delivery port 76 and thence to the control port 85 of the valve device 18 via the pipe 102.

The build up of pressure at this control port 85 deflects the other one of the two diaphragms of valve device 18 to operate it to establish the communication between its supply port 86 and delivery port 87 whereupon fluid under pressure from the main reservoir 3 flows to the valve devices 19, 20, 21 and 22 and volume reservoirs 9 and 10 via the pathways hereinbefore described to cause operation of these valve devices in the manner hereinbefore described.

Consequently, this operation of valve device 30 cuts off flow of fluid under pressure to the whistle 131 so that the alarm ceases, and this operation of the valve device 22 closes communication between the pipe 132 and atmosphere via this valve device 22. It will be noted, however, that the pipe 132 remains connected to atmosphere via pipes 141 and 143, valve device 25, pipe and passageway 144, suppression valve 60, chamber 69 and passageway 70.

Consequently, after the vehicle and any trailing vehicles hauled thereby have been brought to a stop by the abovedescribed safety control brake application and all danger has past, in order to effect a release of this safety control brake application, it is necessary for the operator to first move the handle 154 of the brake valve device 13 from its release position to its suppression position to cause the suppression valve 60 to be moved to a position to close communication between pipe and passageway 144 and atmosphere so that the fluid under pressure supplied from the outlet of choke 98 to the pipes 132, 141 and 143 cannot flow to atmosphere.

Subsequent to moving the brake valve handle 154 to its suppression position so that pipe 144 is cut off from atmosphere, the fluid under pressure supplied from the main reservoir 3 to the pipe 141 via the choke 98 increases the pressure at the control port 83 of the valve device 24 until this device is operated to close communication between its supply port 81 and its delivery port 82 and open this delivery port 82 to atmosphere.

With delivery port 82 of valve device 24 open to atmosphere, fluid under pressure will be released from: (1) control port 77 of valve devices 25 and 28, and (2) control port 95 of valve device 27.

The valve device 25 now operates to close communication between its supply port 75 and delivery port 76. Therefore, the operator may return the brake valve handle 154 to its release position whereupon the pipe 144 is again open to atmosphere via the suppression valve 60 in its release position.

Likewise, the valve device 28 operates to close communication between its supply port 75 and delivery port 76 and open this port 76 to atmosphere whereupon the fluid under pressure in the volume reservoir 12 is vented to atmosphere.

The release of fluid under pressure from the control port 95 of the valve device 27 causes this valve device to establish a communication between its supply port 93 and its delivery port 94 whereupon fluid under pressure flows from the regulating valve 30 of the brake valve 13 to the equalizing reservoir 37 and chamber 39 in relay valve 29.

The relay valve 29 now operates to effect charging of the brake pipe 1 and the control valve 14 operates in response to this charging of the brake pipe 1 to effect a release of the fluid under pressure in the brake cylinder 2 and at the control port 77 of the valve device 15 to atmosphere. This release of fluid under pressure from the brake cyliner 2 effects a release of the safety control brake application.

The release of fluid under pressure from the control port 77 of the valve device 15 causes this valve device to operate to close communication between its supply port 75 and delivery port 76 and open the latter to atmosphere to release fluid under pressure from the control port 85 of the valve device 18 via pipe 102 and the valve device 15.

Valve device 18 will now operate to connect its delivery port 87 to atmosphere. Accordingly, to prevent another safety control brake application, the operator must close and open the sensing port in the valve device 16 in the proper timed sequence.

If the speed of the internal combustion engines of the vehicle exceed a chosen speed, the overspeed relay 139 (FIG. 1B) is deenergized to effect opening of its contact 138 thereby deenergizing the solenoid of the valve device 23.

When the solenoid of the valve device 23 is deenergized, its biasing spring and diaphragms operate this valve device to establish a communication between its supply port 91 and its delivery port 92 which is connected to the whistle 131 via pipe 137, double check valve device 128 and pipe 130. Therefore, fluid under pressure will be vented from the volume reservoir 11 and pipes 134, 132, 141 and 143 to atmosphere via the whistle 131, it being noted that the sounding of the whistle 131 is an indication to the operator of the vehicle that a penalty or overspeed brake application is about to occur. The fluid under pressure in the volume reservoir 11 and the pipes 134, 132, 141 and 143 is vented through the whistle faster than it can be supplied to the pipe 132 via the choke 98. Accordingly, after a predetermined time interval, determined by the volume of the reservoir 11 with respect to the flow capacity of the choke 98 and the whistle 131, such as, for example, 6 seconds, the pressure at the control port 83 of the valve device 24 is reduced sufficiently to cause this valve device to establish a communication between its supply port 81 and its delivery port 82. When a communication is thus established between the supply port 81 and the delivery port 82 of the valve device 24, a full service brake application is effected in the manner hereinbefore explained.

If the operator of the vehicle ceases to sequentially open and close the sensing port in the valve device 16 in the proper timed sequence, the safety control brake application that would result therefrom can be suppressed by movement of the handle 154 of the brake valve 13 from its release position arcuately to its suppression position to cause the suppression valve 60 of brake valve device 13 to close communication between pipe 144 and atmosphere.

While the suppression valve 60 occupies its suppression position, fluid under pressure from the main reservoir 3 is supplied therethrough to the passageway and pipe 108, as explained in hereinbefore-mentioned U.S. Pat. No. 2,958,561. Fluid under pressure thus supplied to the pipe 108 flows to the control port 77 of the valve device 15 via the double check valve 104 and pipe 103. When the pressure at this control port 77 has increased to the hereinbefore-mentioned value of 25 pounds per square inch, this valve device 15 is operated to effect the supply of fluid under pressure to the control port 85 of the valve device 18 whereupon the valve devices 19, 20, 21 and 22 are operated in the manner hereinbefore described.

Operation of the valve device 22 to close communication between the pipe 132 and atmosphere via this valve device causes the supply of fluid under pressure to the control port 83 of the valve device 24 and the supply port 75 of the valve device 25. Since this supply port 75 is in communication with the delivery port 76 which is cut off from atmosphere by the suppression valve 60 that now is in its suppression position, pressure will increase at the control port 83 of the valve device 24. Consequently, valve device 24 operates to cut off its supply port 81 from its delivery port 82 and open this delivery port to atmosphere so that the control port 77 of the valve devices 25 and 28 and control port 95 of valve device 27 are all open to atmosphere.

With the control port 77 of valve device 28 thus open to atmosphere, communication is closed between its supply port 75 and its delivery port 76 and this port 76 opened to atmosphere to release fluid under pressure from the volume reservoir 12.

When fluid under pressure is released from the control port 95 of valve device 27, fluid under pressure from the regulating valve 30 can flow therethrough to the equalizing reservoir 37 and chamber 39 in the relay valve 29.

The release of fluid under pressure from the control port 77 of valve device 25 causes this valve device to operate to close communication between its supply port 75 and delivery port 76. Consequently, the operator may now return the brake valve handle 154 to its release position to cause suppression valve 60 to be returned to its release position whereupon the relay valve 29 will operate to supply fluid under pressure to the brake pipe 1 to cause a brake release, provided of course, that the operator opens and closes the sensing port in the valve device 16 in the proper timed sequence so as to prevent another safety control brake application.

If the apparatus constituting the present invention is installed on a locomotive and this locomotive is a trailing unit in multiple unit operation, to condition this apparatus for proper trailing unit operation it is necessary that:

1. The cut-off valve 35 of brake valve device 13 be manually moved to its cut out position to effect the supply of fluid under pressure from the main reservoir 3 to a passageway 164 that leads to a chamber in the brake pipe cut-off valve (not shown) to cause this cut-off valve to close communication between passageway 54 and the brake pipe 1 so that operation of the relay valve 29 does not release fluid under pressure from the brake pipe 1 when overspeed of the trailing unit causes valve device 23 to operate to release fluid under pressure from safety control pipes 132 and 141 to cause operation of valve device 28 to connect equalizing reservoir 37 to volume reservoir 12. Accordingly, the pressure in the brake pipe 1 is controlled from the leading locomotive.

2. Brake valve handle 154 must be moved to its handle off position to move suppression valve 60 to its handle off position in which:

A. Fluid under pressure from the main reservoir 3 is supplied to control port 77 of valve device 15 via suppression valve 60, passageway and pipe 108, double check valve device 104 and pipe 103 to cause this valve device 15 to supply fluid under pressure to control port 85 of valve device 18.

B. Valve device 18 operates to supply fluid under pressure to:

1. control port 83 of valve device 19 to cut off its supply port 81 from its delivery port 82 so that:
         a. volume reservoir 9 is charged to main reservoir pressure,
         b. main reservoir pressure at control port 83 of valve device 20 operates this valve device to close communication between its supply port 81 and delivery port 82 to prevent flow of fluid under pressure to whistle 131.

2. Control port 83 of valve device 21 to cut off its supply port 81 from its delivery port 82 so that:
         a. volume reservoir 10 is charged to main reservoir pressure,
         b. main reservoir pressure at control port 83 of valve device 22 operates this valve device to close communication between its supply port 81 and delivery port 82 to prevent flow of fluid under pressure from the safety control pipe 132 to atmosphere.

From the foregoing, it is apparent that the brakes on a trailing locomotive are under the control of the operator on the leading locomotive and it is not necessary that the sensing port in the valve device 16 on the trailing locomotive be opened and closed in the proper timed sequence.

Having now described the invention, what I claim as new and desire to secure by Letters Patent, is:

1. A fluid pressure operated safety control apparatus for use on a vehicle to cause a brake application thereon in response to failure of an operator to perform a duty, said safety control apparatus comprising, in combination:

a. a safety control pipe normally charged with fluid under pressure,
   b. means for effecting the supply of fluid under pressure from a source of compressed fluid to said safety control pipe at a certain chosen rate, wherein the improvement comprises:
   c. a first NOT valve having a supply port connected to said safety control pipe, a delivery port open to atmosphere and a control port the release of fluid under pressure from which causes operation of said first NOT valve to effect a release of fluid under pressure from said safety control pipe to atmosphere at a rate in excess of said chosen rate, and the supply of fluid under pressure to which causes operation of said first NOT valve to cut off said safety control pipe from atmosphere to cause an increase of pressure therein in response to the supply of fluid under pressure thereto by said fluid pressure supply means,
   d. first IDENTITY valve means having control port means the supply of fluid under pressure to which operates said IDENTITY valve means to cause a brake application on the vehicle,
   e. a second NOT valve having a supply port to which fluid under pressure may be supplied from the source of compressed fluid, a delivery port connected to said control port means of said IDENTITY valve means and a control port connected to said safety control pipe, the release of fluid under pressure from which by operation of said first NOT valve causes operation of said second NOT valve to effect the supply of fluid under pressure from its supply port to said control port means of said IDENTITY valve means, and
   f. valve means comprising:
      i. an OR valve having a supply port to which fluid under pressure may be supplied from the source of compressed fluid, a delivery port connected to said control port of said first NOT valve and a pair of control ports the supply of fluid under pressure to either or both of which causes operation of said OR valve to effect the supply of fluid under pressure from its supply port to said control port of said first NOT valve,
      ii. a third NOT valve having a supply port, a delivery port connected to one of said pair of control ports of said OR valve and a control port the release of fluid under pressure from which causes operation of said third NOT valve to establish a communication between its supply port and its delivery port, and the supply of fluid under pressure to which causes operation of said third NOT valve to close communication between said supply and delivery ports and connect said delivery port to atmosphere to release fluid under pressure from said one of said pair of control ports of said OR valve, and
      iii. a first IDENTITY valve having a supply port to which fluid under pressure may be supplied from the source of compressed fluid, a delivery port connected to said supply port and said control port of said third NOT valve, a control port to which fluid under pressure may be supplied from the source of compressed fluid, and a sensing port that when manually closed and opened by an operator in a predetermined timed sequence, is effective to cause said OR valve to operate to render said first NOT valve ineffective to release fluid under pressure from said safety control pipe to effect a brake application.

2. A safety control apparatus, as recited in claim 1, further characterized by a first one-way flow valve means controlling flow of fluid under pressure from said delivery port of said OR valve to said control port of said first NOT valve, and by a fourth NOT valve having a supply port connected to the delivery of said one-way flow valve means and said control port of said first NOT valve, a delivery port having a restriced communication with atmosphere and a control port connected to said delivery port of said OR valve, said fourth NOT valve being operable in response to the absence of fluid under pressure at its control port to effect the release of fluid under pressure from the control port of said first NOT valve to atmosphere at a first restricted rate.

3. A safety control apparatus, as recited in claim 1, further comprising:
 a. a first volume reservoir connected to said control port of said first NOT valve,
 b. a first one-way flow valve means controlling flow of fluid under pressure from said delivery port of said OR valve to said first volume reservoir and said control port of said first NOT valve, and
 c. a fourth NOT valve having a supply port connected to said first volume reservoir and said control port of said first NOT valve, a delivery port having a restricted communication with atmosphere and a control port connected to said delivery port of said OR valve, said fourth NOT valve being operable in response to the absence of fluid under pressure at its control port to effect the release of fluid under pressure from said first volume reservoir and the control port of said first NOT valve to atmosphere at a first restricted rate.

4. A safety control brake apparatus, as recited in claim 1, further characterized by a fluid pressure operated alarm means, and by a fifth NOT valve having a supply port to which fluid under pressure may be supplied from the source of compressed fluid, a delivery port connected to said alarm means and a control port supplied with fluid under pressure from said delivery port of said OR valve, said fifth NOT valve being operable in response to the absence of fluid under pressure at its control port to effect the supply of fluid under pressure from its supply port to said alarm means to effect the operation thereof.

5. A safety control apparatus, as recited in claim 4, further comprising:
 a. a second one-way flow valve means controlling flow of fluid under pressure from said delivery port of said OR valve to said control port of said fifth NOT valve,
 b. a second volume reservoir connected to said control port of said fifth NOT valve, and
 c. a sixth NOT valve having a supply port connected to said second volume reservoir and said control port of said fifth NOT valve, a delivery port having a restricted communication with atmosphere and a control port connected to said delivery port of said OR valve, said sixth NOT valve being operable in response to the absence of fluid under pressure at its control port to effect the release of fluid under pressure from said second volume reservoir and the control port of said fifth NOT valve to atmosphere at a second restricted rate that is greater than said first restricted rate whereby said fifth NOT valve effects the supply of fluid under pressure to said fluid pressure alarm means to sound an alarm prior to operation of said first NOT valve to effect a release of fluid under pressure from said safety control pipe thereby enabling the operator to forestall a safety control brake application by sequentially closing and opening said sensing port of said first IDENTITY valve in said predetermined timed sequence.

6. A safety control apparatus, as claimed in claim 4, further comprising:
 a. a third volume reservoir,
 b. a third one-way flow valve means controlling flow of fluid under pressure from said safety control pipe to said third volume reservoir,
 c. a double check valve device having its delivery port connected to said alarm means and one inlet port connected to the delivery port of the fifth NOT valve, and
 d. a second IDENTITY valve having a supply port and a control port connected to said third volume reservoir, and a delivery port connected to the other inlet port of said double check valve device, said second IDENTITY valve having spring means and a solenoid connected in an overspeed circuit that is deenergized in response to an overspeed condition to render said spring means effective to cause fluid under pressure supplied to said control port to operate said second IDENTITY valve to release fluid under pressure from said third volume reservoir and said safety control port to atmosphere via said alarm means at a rate in excess of said chosen rate to effect operation of said second NOT valve to supply fluid under pressure to said control port means of said IDENTITY valve means to cause a brake application.

7. A fluid pressure operated safety control apparatus for use on a vehicle having a brake pipe charged to a normal chosen pressure to effect a brake release, a reduction from which chosen pressure effects a brake application to a degree corresponding to said reduction, an equalizing reservoir and a brake valve device that has a multi-position suppression valve which in one position opens a pair of passageways to atmosphere and in another position closes communication between one of said passageways and atmosphere and effects the supply of fluid under pressure from a source of fluid under pressure to the other, the brake valve device also having a regulating valve for controlling the pressure in the equalizing reservoir and a relay valve operable in response to variations of the pressure in the equalizing reservoir to correspondingly vary the pressure in the brake pipe, said safety control apparatus comprising, in combination:
 a. a safety control pipe normally charged with fluid under pressure from a source of compressed fluid,
 b. means for effecting the supply of fluid under pressure from a source of compressed fluid to said safety control pipe at a certain chosen rate, wherein the improvement comprises:
 c. a first NOT valve having a supply port connected to said safety control pipe, a delivery port open to atmosphere and a control port the release of fluid under pressure from which causes operation of said first NOT valve to effect a release of fluid under pressure from said safety control pipe to atmosphere at a rate in excess of said chosen rate, and the supply of fluid under pressure to which causes operation of said first NOT valve to cut off said safety control pipe from atmosphere to cause an increase of pressure therein in response to the supply of fluid under pressure thereto by said fluid pressure supply means, d. a volume reservoir, e. first IDENTITY valve means comprising:
  i. a first IDENTITY valve having a supply port connected to the regulating valve of the brake valve, a control port to which fluid under pressure may be supplied from the source of compressed fluid so long as the suppression valve occupies its one position, and a delivery port supplied with fluid under pressure from the supply port while fluid under pressure is supplied to the control port,
  ii. a NOT 2 valve having a control port, a supply port connected to the delivery port of said first IDENTITY valve and a delivery port connected to the equalizing reservoir and the relay valve of the brake valve device, said supply port being connected to said delivery port in the absence of fluid under pressure at said control port, and
  iii. a second IDENTITY valve having a control port, a supply port connected to the equalizing reservoir and a delivery port connected to said volume reservoir, and f. a second NOT valve having a supply port to which fluid under pressure may be supplied from the source of compressed fluid, a delivery port connected to the control port of said NOT 2 valve and said second IDENTITY valve and a control port connected to said safety control pipe, the release of fluid under pressure from which by operation of said first NOT valve establishes a communication between said supply and delivery ports whereby fluid under pressure is supplied to the control port of said NOT 2 valve and said second IDENTITY valve to effect operation thereof to establish a communication between the equalizing reservoir and the volume reservoir whereby the reduction of pressure effected in the equalizing reservoir by the flow of fluid under pressure therefrom to said volume reservoir until equalization of pressure in these reservoirs occurs causes the relay valve of the brake valve device to effect a corresponding reuction of pressure in the brake pipe to cause a brake application.

8. A safety control apparatus, as recited in claim 7, further characterized in that the cubic capacity of said volume reservoir is such that the reduction of pressure in the equalizing reservoir is sufficient to cause the relay valve to reduce brake pipe pressure the amount required to effect a full service brake application on the vehicle.

9. A safety control apparatus, as recited in claim 7, further characterized by a third IDENTITY valve having a supply port connected to said safety control pipe, a delivery port connected to said one passageway of said pair of passageways and a control port connected to the delivery port of said second NOT valve whereby operation of said second NOT valve causes operation of said third IDENTITY valve to close communication between said safety control pipe and said one passageway to prevent escape of fluid under pressure from said safety control pipe via the suppression valve while in its said one position.

10. A safety control apparatus, as recited in claim 7, further characterized by a one-way flow valve means having an inlet port connected to the equalizing reservoir and an outlet port connected to the regulating valve of the brake valve device whereby a reduction of pressure in the equalizing reservoir to cause a corresponding reduction of pressure in the brake pipe may be effected by manual operation of the brake valve device.

11. A safety control apparatus, as recited in claim 7, further characterized by a second IDENTITY valve means comprising:
  a. an OR valve having a supply port to which fluid under pressure may be supplied from the source of compressed fluid, a delivery port connected to said control port of said first NOT valve and a pair of control ports the supply of fluid under pressure to either or both of which causes operation of said OR valve to effect the supply of fluid under pressure from its supply port to said control port of said first NOT valve,
  b. a third NOT valve having a supply port, a delivery port connected to one of said pair of control ports of said OR valve and a control port the release of fluid under pressure from which causes operation of said third NOT valve to establish a communication between its supply port and its delivery port, and the supply of fluid under pressure to which causes operation of said third NOT valve to close communication between said supply and delivery ports and connect said delivery port to atmosphere to release fluid under pressure from said one of said pair of control ports of said OR valve, and
  c. a fourth IDENTITY valve having a supply port to which fluid under pressure may be supplied from the source of compressed fluid, a delivery port connected to said supply port and said control port of said third NOT valve, a control port to which fluid under pressure may be supplied from the source of compressed fluid, and a sensing port that when manually closed and opened by an operator in a predetermined timed sequence, is effective to cause said OR valve to operate to render said first NOT valve ineffective to release fluid under pressure from said safety control pipe to effect a brake application.

12. A safety control apparatus, as recited in claim 11, further characterized by a fifth IDENTITY valve having a supply port to which fluid under pressure may be supplied from the source of compressed fluid, a delivery port connected to the other of said pair of control ports of said OR valve and a control port connected to said other passageway whereby, while said suppression valve is in its said other position and pressure of fluid at said control port exceeds a chosen value, said fifth IDENTITY valve constantly supplies fluid under pressure to the other of said pair of control ports to cause said OR valve to constantly supply fluid under pressure to said control port of said first NOT valve to prevent operation of said first NOT valve to release fluid under pressure from said safety control pipe to atmosphere to cause a brake application so long as said suppression valve is in its said other position.

13. A safety control apparatus, as recited in claim 12, further comprising:
 a. brake applying means to which fluid under pressure is supplied to cause a brake application, and
 b. a double check valve device having one inlet port connected to said brake applying means, a second inlet port connected to said other passageway and a delivery port connected to the control port of said fifth IDENTITY valve whereby upon the pressure of fluid in said brake applying means exceeding said chosen value, said fifth IDENTITY valve constantly supplies fluid under pressure to the other of said pair of control ports of said OR valve.

* * * * *